US012570852B2

(12) United States Patent
Yeh et al.

(10) Patent No.: US 12,570,852 B2
(45) Date of Patent: Mar. 10, 2026

(54) POLYIMIDE PRECURSOR, RESIN COMPOSITION INCLUDING, AND POLYIMIDE FORMED FROM SUCH PRECURSOR, AND USE OF THE POLYIMIDE

(71) Applicant: DAXIN MATERIALS CORP., Taichung (TW)

(72) Inventors: Kuan-Liang Yeh, Taichung (TW); Chi-Yen Lin, Taichung (TW)

(73) Assignee: DAXIN MATERIALS CORP., Taichung City (TW)

( * ) Notice: Subject to any disclaimer, the term of this patent is extended or adjusted under 35 U.S.C. 154(b) by 977 days.

(21) Appl. No.: 17/720,734

(22) Filed: Apr. 14, 2022

(65) Prior Publication Data

US 2022/0340754 A1 Oct. 27, 2022

(30) Foreign Application Priority Data

Apr. 15, 2021 (TW) ................................ 110113613

(51) Int. Cl.
*C08L 79/08* (2006.01)
*C08G 73/10* (2006.01)

(52) U.S. Cl.
CPC .......... *C08L 79/08* (2013.01); *C08G 73/1007* (2013.01); *C08G 73/1046* (2013.01);
(Continued)

(58) Field of Classification Search
CPC ... C08L 79/08; C08L 2203/206; C08G 73/10; C08G 73/1007; C08G 73/1046;
(Continued)

(56) References Cited

U.S. PATENT DOCUMENTS

2018/0090657 A1* 3/2018 Fei .......................... G01J 5/024

FOREIGN PATENT DOCUMENTS

| | | |
|---|---|---|
| CN | 109679095 A | 4/2019 |
| JP | 2007183388 A | 7/2007 |

OTHER PUBLICATIONS

Search Report appended to an Office Action, which was issued to Taiwanese counterpart application No. 110113613 by the TIPO on Sep. 19, 2022 with an English translation thereof, 2 pages.

* cited by examiner

*Primary Examiner* — Shane Fang
(74) *Attorney, Agent, or Firm* — Nixon & Vanderhye PC

(57) ABSTRACT

A polyimide precursor includes a repeating unit of formulae (I) and (II):

(I)

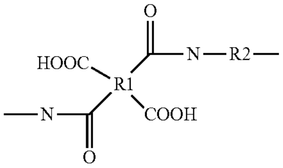

(II)

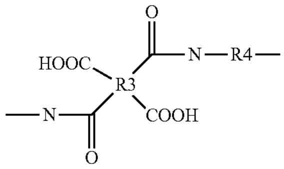

where R1 and R3 are each a tetravalent group of a tetracarboxylic dianhydride residue, and R2 and R4 are respectively a divalent group of a residue of a first-type diamine
(Continued)

and a divalent group of a residue of a second-type diamine. The first-type diamine is represented by formula (III), and the second-type diamine is represented by formula (IV). A resin composition including the polyimide precursor, a polyimide formed from the polyimide precursor, and use of the polyimide are also provided.

11 Claims, 3 Drawing Sheets

(52) U.S. Cl.
CPC ....... *C08G 73/106* (2013.01); *C08G 73/1075* (2013.01); *C08L 2203/206* (2013.01)

(58) Field of Classification Search
CPC .............. C08G 73/106; C08G 73/1075; C08G 73/1042; C08G 73/14; C08J 2379/08
See application file for complete search history.

POLYIMIDE PRECURSOR, RESIN COMPOSITION INCLUDING, AND POLYIMIDE FORMED FROM SUCH PRECURSOR, AND USE OF THE POLYIMIDE

CROSS-REFERENCE TO RELATED APPLICATION

This application claims priority of Taiwanese Patent Application No. 110113613, filed on Apr. 15, 2021.

FIELD

The disclosure relates to a polyimide and a polyimide precursor for forming such polyimide and use of such polyimide. More particularly, the present disclosure relates to a polyimide serving as a material for a sacrificial protection layer applicable during packaging of a semiconductor device, as well as a polyimide precursor for forming such polyimide and use of such polyimide.

BACKGROUND

In order to meet the function requirement for electronic devices nowadays and follow the trend of reducing the size of electronic devices, three-dimensional packaging has gradually replaced two-dimensional packaging that leads to unsatisfactory chip integration density.

During a two-dimensional or three-dimensional packaging process, a molding compound (e.g. an epoxy resin) in liquid state is disposed on and covers a surface of a chip (e.g. a semiconductor chip), and such molding compound is subjected to curing and subsequently to polishing for the surface of the chip to be exposed. Afterward, the next stage of the packaging process is performed. However, since the molding compound is in liquid state before curing, an uncured part of the molding compound easily penetrates into the chip through the circuit of the chip, resulting in mold flash and hence contaminating the chip. Therefore, in order to prevent the circuit of a chip from being contaminated by a molding compound, during some packaging processes, a protection layer is applied to protect the chip before using the molding compound, and then the molding compound is used for packaging.

Since the aforesaid protection layer is usually made from a permanent material that is normally a photo-curable or heat-curable resin composition, such as an epoxy resin, a phenolic resin, and a polyimide resin, such protection layer can be hardly removed through a wet removal process after the resin composition thereof is cured. Therefore, even though the circuit underneath the protection layer can be protected, the protection layer has a certain volume and hence occupies a certain space, adversely affecting the size of the packaged chip. The polyimide resin normally is heat-resistant and has a high strength, and is usually used during packaging of electronic devices. However, the polyimide resin, which can tolerate the high temperature applied during the packaging involving the molding compound, normally is a permanent material or is hardly removable through a wet removal process after the packaging.

Therefore, there is a need to develop a satisfactory polyimide material applicable to packaging of an electronic device.

SUMMARY

A first object of the disclosure is to provide a polyimide precursor. The polyimide precursor includes a repeating unit of formulae (I) and (II):

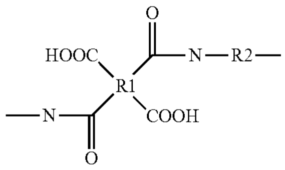

(I)

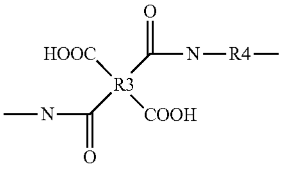

(II)

where R1 and R3 are each a tetravalent group of a tetracarboxylic dianhydride residue, and R2 and R4 are respectively a divalent group of a residue of a first-type diamine and a divalent group of a residue of a second-type diamine. The first-type diamine is represented by formula (III):

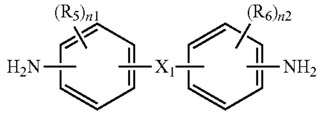

(III)

where $X_1$ is a divalent group containing at least one amide group, $R_5$ and $R_6$ are respectively non-hydrogen substituents, and n1 and n2 are respectively numbers of the non-hydrogen substituents and independently range from 0 to 4. $R_5$ and $R_6$ are independently selected from the group consisting of a halogen, a $C_1$ to $C_3$ alkyl group, and a $C_1$ to $C_3$ haloalkyl group.

The second-type diamine is represented by formula (IV):

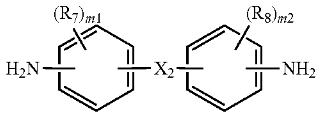

(IV)

where $X_2$ is a divalent group and is not a single bond, $R_7$ and $R_8$ are respectively non-hydrogen substituents, and m1 and m2 are respectively numbers of the non-hydrogen substituents and independently range from 0 to 4, a sum of m1 and m2 being at least 1, $R_7$ and $R_8$ being independently selected from the group consisting of a hydroxyl group, a halogen, a $C_1$ to $C_3$ alkyl group, and a $C_1$ to $C_3$ haloalkyl group, $R_7$ and $R_8$ having at least one hydroxyl group.

A second object of the disclosure is to provide a resin composition. The resin composition includes the aforesaid polyimide precursor and a solvent that dissolves such polyimide precursor.

A third object of the disclosure is to provide a polyimide. The polyimide is a product from polycondensation and ring formation of the aforesaid polyimide precursor, and includes a repeating unit of formulae (X) and (Y):

(X)

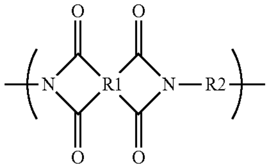

(Y)

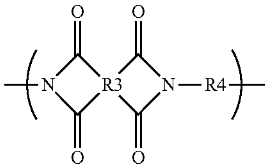

where R1, R2, R3, and R4 have the same definitions as described above.

A fourth object of the disclosure is to provide a semiconductor device. The semiconductor device includes:

- a semiconductor chip having a circuit;
- a sacrificial protection layer disposed to cover at least a lateral side of the circuit; and
- an encapsulating layer disposed to cover at least a lateral side of the sacrificial protection layer,
- wherein the sacrificial protection layer is made from the aforesaid polyimide.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
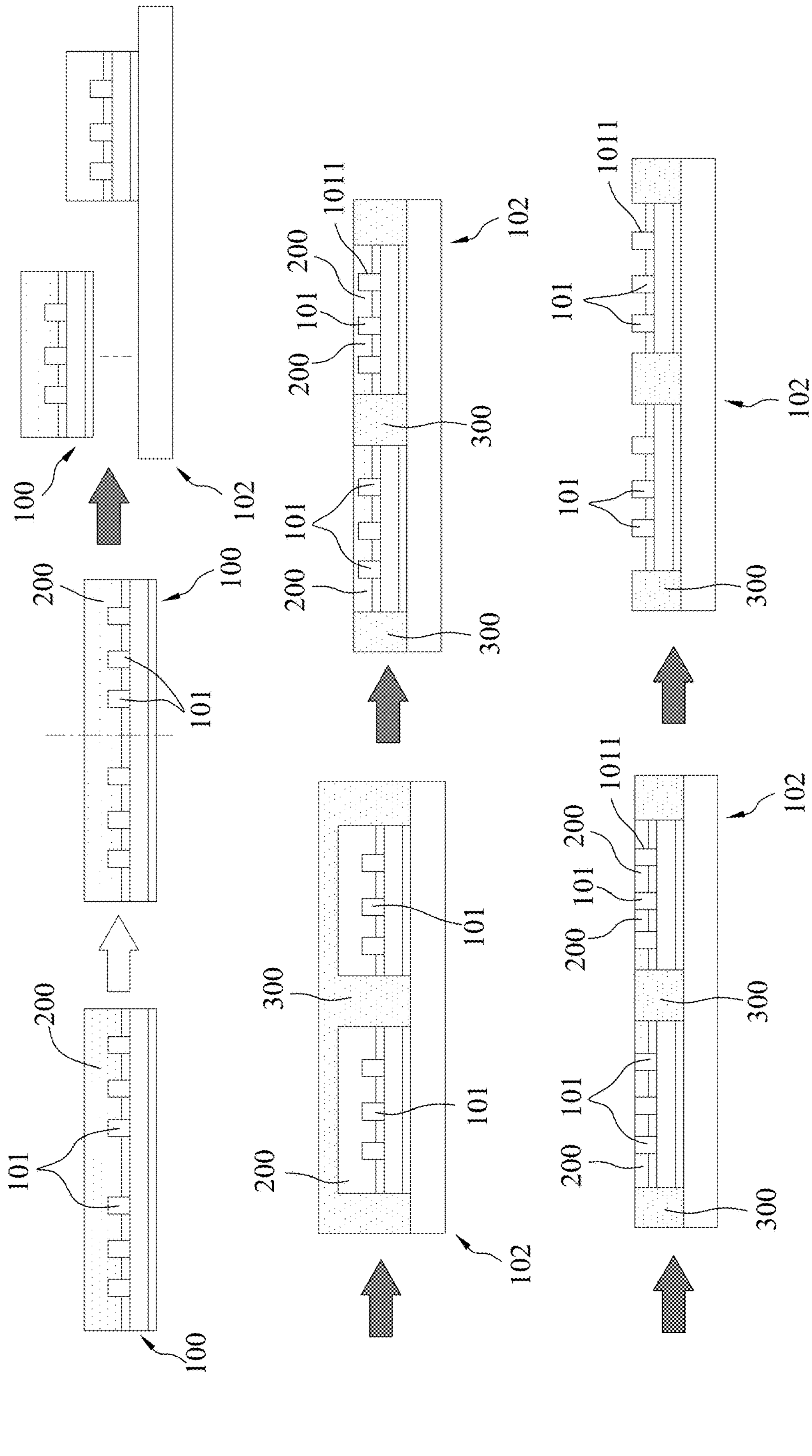
FIG. 1 a schematic flow diagram illustrating an exemplary packaging process for a semiconductor device, which involves a polyimide of the present disclosure serving as a material for a sacrificial protection layer.

The present disclosure provides a polyimide that is adapted to serve as a material for a sacrificial protection layer applicable between a chip (e.g. a semiconductor chip) and a molding compound. The polyimide is obtainable from polycondensation and ring formation (also referred to as ring closure) of a polyimide precursor that is a polymer of an amic acid (i.e. a polyamic acid). Namely, the polyimide is a product from the polycondensation and ring formation of the polyimide precursor. The polyimide includes a repeating unit of the following formulae (X) and (Y):

(X)

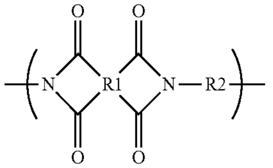

-continued (Y)

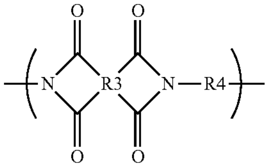

where the definitions of R1, R2, R3, and R4 are described later when formulae (I) and (II) are described.

The polyimide precursor is obtainable from a reaction of a dianhydride compound and a diamine compound. The polyimide precursor may be anon-imidized polyamic acid or a partially imidized polyamic acid.

The diamine compound includes a first-type diamine and a second-type diamine. Based on a total molar amount (i.e. 100 mol %) of the diamine compound, the first-type diamine is present in a molar amount that is not less than 20 mol %. In certain embodiments, based on the total molar amount of the diamine compound, the first-type diamine is present in a molar amount that ranges from 20 mol % to 80 mol %. When the diamine compound further includes another diamine, the arrangement of the polymer chain can be flexibly adjusted, so that the polyimide formed from the polyimide precursor can have more satisfactory resistance to a liquid packaging material and can be removed through a wet removal process. A molar ratio of the first-type diamine to the second-type diamine may range from 0.25 to 5.00 (1.6 to 3.0 in certain embodiments) so as to provide not only satisfactory resistance to a liquid packaging material and but also more improved removability by a wet removal process.

Specifically, the polyimide precursor includes a repeating unit of the following formulae (I) and (II):

(I)

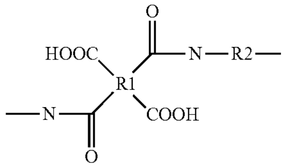

(II)

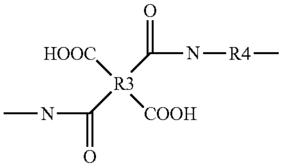

where R1 and R3 are each a tetravalent group of a tetracarboxylic dianhydride residue which may be derived from removing two anhydride groups from a tetracarboxylic dianhydride, and R2 and R4 are respectively a divalent group of a residue of the first-type diamine and a divalent group of a residue of the second-type diamine. The residue of the first-type diamine may be derived from removing two amino groups from the first-type diamine, and the residue of the second-type diamine maybe derived from removing two amino groups from the second-type diamine.

The dianhydride compound may at least include an aromatic tetracarboxylic dianhydride. Based on a total molar amount (i.e. 100 mol %) of the dianhydride compound, the aromatic tetracarboxylic dianhydride may be present in a molar amount that is not less than 30 mol %, so that the polyimide formed from the polyimide precursor has better attachability to a chip having a circuit.

In certain embodiments, the aromatic tetracarboxylic dianhydride may be selected from aromatic tetracarboxylic dianhydrides having 1 to 4 benzene rings. The aromatic tetracarboxylic dianhydride may be selected from the group consisting of at least one rigid tetracarboxylic dianhydride, at least one flexible tetracarboxylic dianhydride, and a combination rigid thereof. Examples of the tetracarboxylic dianhydride include, but are not limited to, 1,2,4,5-benzenetetracarboxylic anhydride (also referred to as pyromellitic dianhydride (PMDA)) and 3,3',4,4'-biphenyltetracarboxylic dianhydride (BPDA). Examples of the flexible tetracarboxylic dianhydride include, but are not limited to, 4,4-oxydiphthalic anhydride (ODPA), benzophenone-3,3',4,4'-tetracarboxylic dianhydride (BTDA), 4,4'-(hexafluoroisopropylidene)diphthalic anhydride (6FDA), and 4,4'-(4,4'-isopropylidenediphenoxy)bis(phthalic anhydride) (BPADA). When more of the flexible tetracarboxylic dianhydride is used, the polyimide formed from the polyimide precursor has better attachability to a chip having a circuit.

In certain embodiments, the dianhydride compound further includes an alicyclic tetracarboxylic dianhydride. The alicyclic tetracarboxylic dianhydride may be selected from the group consisting of cyclobutane-1,2,3,4-tetracarboxylic dianhydride (CBDA), 1,2,4,5-cyclohexanetetracarboxylic dianhydride (HPMDA), and a combination thereof.

It should be noted that when the dianhydride compound for obtaining the polyimide precursor includes both the aromatic tetracarboxylic dianhydride and the alicyclic tetracarboxylic dianhydride, a molar ratio of the aromatic tetracarboxylic dianhydride to the alicyclic tetracarboxylic dianhydride larger than 3:7 renders the polyimide formed from the polyimide precursor more attachable to a chip having a circuit.

The first-type diamine is represented by the following formula (III):

(III)

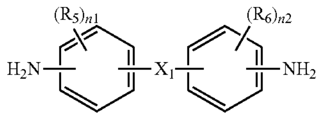

where $X_1$ is a divalent group containing at least one amide group, $R_5$ and $R_6$ are respectively non-hydrogen substituents (on corresponding benzene rings), and n1 and n2 are respectively numbers of the non-hydrogen substituents and independently range from 0 to 4. $R_5$ and $R_6$ are independently selected from the group consisting of a halogen, a $C_1$ to $C_3$ alkyl group, and a $C_1$ to $C_3$ haloalkyl group.

Further, the first-type diamine may be represented by the following formula (III-1) or formula (III-2):

(III-1)

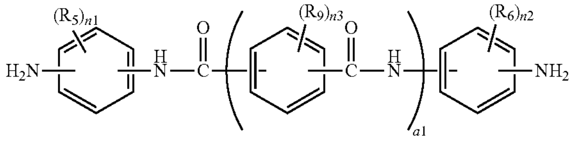

-continued (III-2)

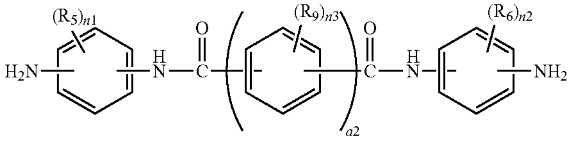

where $R_9$ is a non-hydrogen substituent (on a corresponding benzene ring), and n3 is a number of the non-hydrogen substituent and ranges from 0 to 4. $R_9$ is selected from the group consisting of a halogen, a $C_1$ to $C_3$ alkyl group, and a $C_1$ to $C_3$ haloalkyl group. a1 ranges from 0 to 3, and a2 ranges from 1 to 3.

In certain embodiments, $R_9$ is a $C_1$ to $C_3$ haloalkyl group.

The first-type diamine may be selected from the group consisting of 4,4'-diamino benzanilide (DABA), N,N'-(2,2'-bis(trifluoromethyl)-[1,1'-biphenyl]-4,4'-diyl)bis(4-aminobenzamide) (AB-TFMB), (N,N'-bis(4-aminophenyl)benzene-1,4-dicarboxamide (DATA), and combinations thereof.

In certain embodiments, $X_1$ in formula (III) is a divalent group containing one amide group. In particular, when the benzene rings of the first-type diamine have hydrogen and no other substituent (i.e. n1 and n2 are 0), for instance, DABA (where n1 and n2 are 0 and a1 is 0). Such first-type diamine has smaller steric hindrance, so that the molecular distance between the first-type diamine and the second-type diamine can be rendered optimal to form a well stacked structure and to have hydrogen bonds between the amide groups or between the amide and hydroxyl groups more easily cooperative. Thus, upon the drastic temperature change during the packaging, the polyimide formed from the polyimide precursor not only can prevent a liquid packaging material (e.g. an epoxy resin composition) from penetration, but also can be removed through a wet removal process, hence having satisfactory resistance against the liquid packaging material and excellent removability by a wet removal process.

The second-type diamine is represented by the following formula (IV):

(IV)

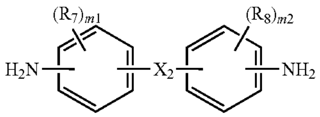

where $X_2$ is a divalent group and is not a single bond, $R_7$ and $R_8$ each are respectively non-hydrogen substituents (on corresponding benzene rings), and m1 and m2 each are respectively numbers of the non-hydrogen substituents and independently range from 0 to 4. A sum of m1 and m2 is at least 1. $R_7$ and $R_8$ are independently selected from the group consisting of a hydroxyl group, a halogen, a $C_1$ to $C_3$ alkyl group, and a $C_1$ to $C_3$ haloalkyl group. $R_7$ and $R_8$ have at least one hydroxyl group.

In certain embodiments, each of $R_7$ and $R_8$ has at least one hydroxyl group.

In certain embodiments, $X_2$ is not a single bond and is a divalent group having no benzene ring. For instance, $X_2$ may be a disubstituted methylene group or a sulfone group. The substituents of the disubstituted methylene group may be haloalkyl groups (e.g. $—CF_3$) or alkyl groups (e.g. $—CH_3$).

The second-type diamine may be selected from the group consisting of 2,2-bis(3-amino-4-hydroxyphenyl)hexafluoropropane (BisAPAF), 2,2-bis(3-amino-4-hydroxylphenyl) propane (BAP), 4,4'-sulphonylbis(2-aminophenol) (BAS), and combinations thereof.

It should be noted that, under the circumstance that the property is not adversely affected, the diamine compound may further include a third-type diamine. The third-type diamine is a diamine that has, in a structure thereof, a soft segment. Based on the total molar amount of the diamine compound, the third-type diamine is present in a molar amount that is not greater than 30 mol %.

The soft segment may be composed of one or more groups that easily generate intramolecular rotation. The third-type diamine may be represented by the following formula (V):

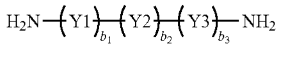

(V)

where Y1, Y2, and Y3 constitute the soft segment, and are independently selected from the group consisting of an ether-containing group, a siloxane-containing group, an alkylene group, and an alicyclic ring-containing group, and a sum of b1, b2, and b3 is larger than 0.

In certain embodiments, the soft segment of the third-type diamine may contain a siloxane-containing divalent group or an ether-containing divalent group (e.g. having a repeating unit of ethylene oxide or propylene oxide). Furthermore, in order to maintain excellent resistance to a liquid packaging material, removability by a wet removal process, and adhesion, the third-type diamine may have a molecular weight that is not larger than 2000.

The third-type diamine may be selected from the group consisting of O,O'-bis(2-aminopropyl)polypropylene glycol, 3,3'-(1,1,3,3-tetramethyldisiloxane-1,3-diyl)bispro pylamine, a fatty dimer diamine (FDD) containing straight-chain aliphatic side chains, and combinations thereof. The FDD may be represented by the following formula (VI):

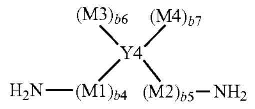

(VI)

where Y4 is selected from the group consisting of a hydrocarbylene group, a benzene ring, an aliphatic ring, and a cycloolefin, M1 and M2 are selected from the group consisting of a hydrocarbylene group, an ether group, and a siloxane group, b4 and b5 are each a number of a repeating unit and are each larger than 0 and not greater than 100, M3 and M4 are selected from the group consisting of hydrogen, a hydrocarbylene group, an ether group, and a siloxane group, b6 is a number of a repeating unit of M3 selected from the group consisting of a hydrocarbylene group, an ether group, and a siloxane group, b7 is a number of a repeating unit of M4 selected from the group consisting of a hydrocarbylene group, an ether group, and a siloxane group, and b6 and b7 are each larger than 0 and not greater than 100.

In certain embodiments, the diamine compound further includes another diamine other than the first-type, second-type, and third-type diamines. Based on the total molar amount of the diamine compound, the another diamine is present in a molar amount that is not greater than 10 mol %.

Specifically, the another diamine is an aromatic diamine other than the first-type, second-type, and third-type diamines. The another diamine may be selected from the group consisting of 4,4'-diaminodiphenyl ether (ODA), 4,4'-diaminodiphenyl sulfone (DDS), bis[4-(4-aminophenoxy) phenyl] hexafluoropropane (HFBAPP), 9,9-bis(4-aminophenyl)fluorene (FDA), 2-(3-amino-phenyl)-benzooxazol-5-ylamine (APABO), bis(4-aminophenyl) terephthalate (ABHQ), 2,2'-bis(trifluoromethyl)benzidine (TFMB), 1,3-bis(4-aminophenoxy)benzene (TPE-R), and combinations thereof.

The aforesaid polyimide may be prepared as follows. The dianhydride compound and the diamine compound are dissolved in a solvent, and a molar ratio of the diamine compound to the dianhydride compound is controlled to range from 0.97:1 to 1.03:1. The dianhydride compound and the diamine compound are allowed to react with each other at a predetermined temperature so as to form the aforesaid polyimide precursor. Therefore, a resin composition containing the solvent and the polyimide precursor soluble in the solvent is obtained. Subsequently, the polyimide precursor in the resin composition is subjected to dehydration through heating under a high temperature or a chemical catalyst for polycondensation and ring closure to proceed, such that the polyimide is obtained.

It should be noted that the solvent is not particularly limited to a certain solvent or a certain combination of solvents, as long as the solvent is an organic solvent that can dissolve the reactants and polymer.

The solvent may be selected from the group consisting of an amide-based solvent, a cyclic amide-based solvent, an ester-based solvent, an ether-based solvent, and combinations thereof. Examples of the solvent include, but are not limited to, N,N-dimethylformamide (DMF), N,N-diethylformamide (DEF), N,N-dimethylacetamide (DMA), N-methylcaprolactam, dimethyl sulfoxide (DMSO), N-methylpyrrolidone (NMP), gamma-butyrolactone (GEL), propylene glycol methyl ether acetate (PGMEA), tetramethylurea, hexamethylphosphoramide (HMPA), pyridine, propylene glycol methyl ether, and butyl acetate. One or more of the aforesaid examples of the solvent may be used, on the proviso that the reactants and polymer do not precipitate.

Since the polyimide of the present disclosure has resistance to a liquid packaging material, such polyimide can be used to protect a chip during packaging, such that the chip can be prevented from penetration and contamination by the liquid packaging material under a high temperature during the packaging. Moreover, after the packaging, the polyimide of the present disclosure can be removed through a dry etching process (which employs, for instance, $O_2$ plasma or $CF_4$ plasma) or a wet removal process (which employs a cleaning liquid, for instance, an inorganic base such as sodium hydroxide, or an organic base such as tetramethylammonium hydroxide (TMAH) and monoethanolamine (MEA)). The polyimide of the present disclosure may be completely or partially removed under a predetermined condition. Therefore, the circuit of the chip previously protected can be exposed, such that subsequent design for electrical connection with the circuit of the chip can be more flexible.

An exemplary packaging process for a semiconductor device, which involves the polyimide of the present disclosure, is illustrated in FIG. 1. The polyimide of the present disclosure serves as a material of a sacrificial protection layer 200 disposed between a circuit 101 of a semiconductor chip 100 and an encapsulating layer 300 formed from a liquid molding compound (LMC).

Specifically, before the liquid molding compound is applied for packaging, the resin composition containing the polyimide precursor of the present disclosure is coated on a surface of the chip 100 having the circuit 101. Subsequently, the polyimide precursor in the resin composition is subjected to polycondensation and ring closure under a high temperature so as to form the polyimide, and the solvent in the resin composition is removed. Accordingly, the sacrificial protection layer 200 is formed on the surface of the chip 100 and is made from the resulting polyimide, thereby having resistance to the liquid molding compound to be applied.

As shown in FIG. 1, the chip 100 having the sacrificial protection layer 200 thereon is cut, along an imaginary line, into portions which are later transferred to a packaging substrate 102. The liquid molding compound is then applied to form the encapsulating layer 300. Alternatively, the encapsulating layer 300 is formed on the sacrificial protection layer 200 first, and then the chip 100 having the sacrificial protection layer 200 and the encapsulating layer 300 thereon is cut into portions which are later transferred to the packaging substrate 102 (not shown in the drawings). Since the chip 100 is protected by the sacrificial protection layer 200, the liquid molding compound in the encapsulating layer 300 is prevented from penetration into the chip 100 through the circuit 101, such that the chip 100 is prevented from contamination by the liquid molding compound in the encapsulating layer 300.

Figure 2:
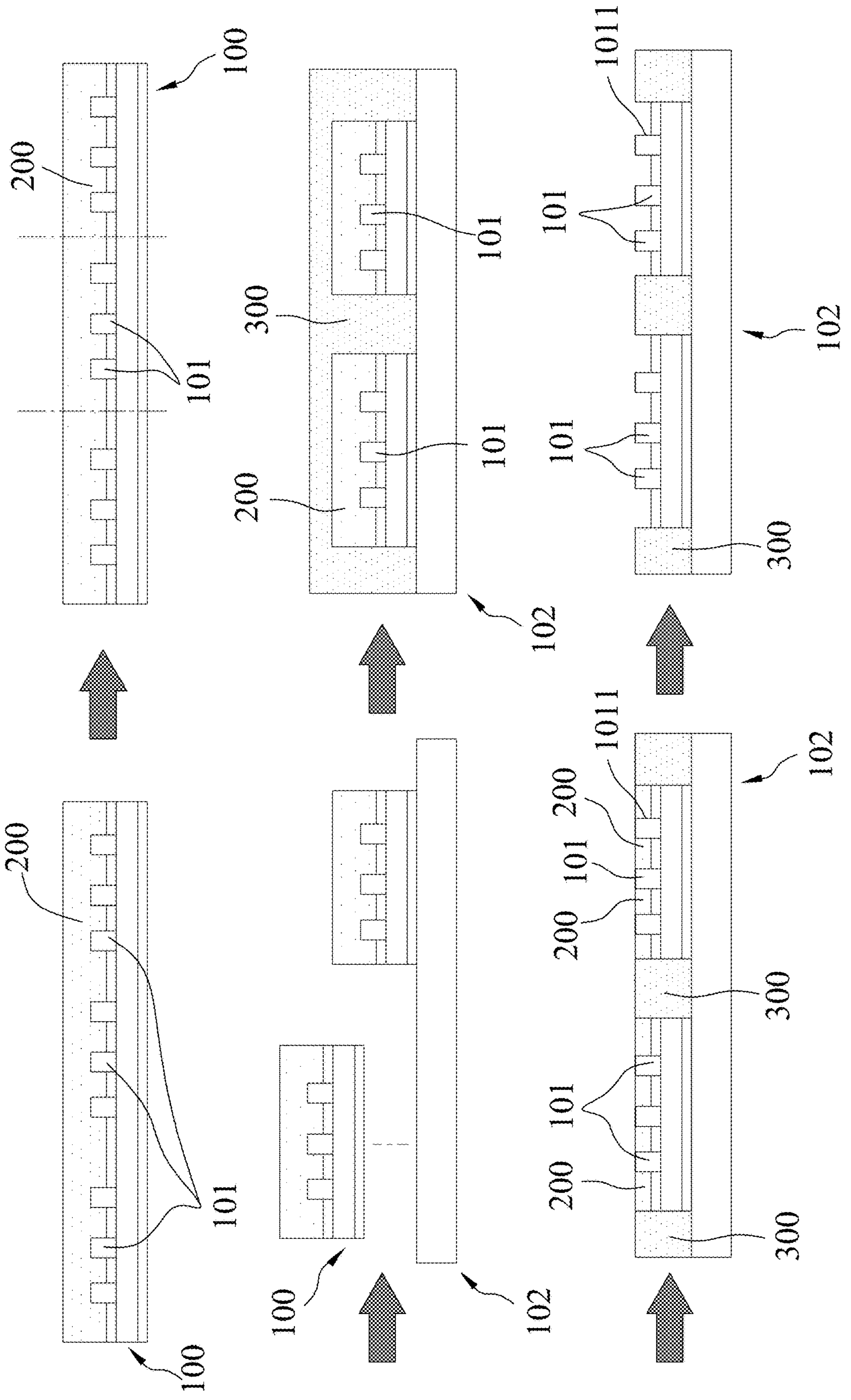
FIG. 2 is a schematic flow diagram illustrating a variation of the exemplary packaging process.
Figure 3:
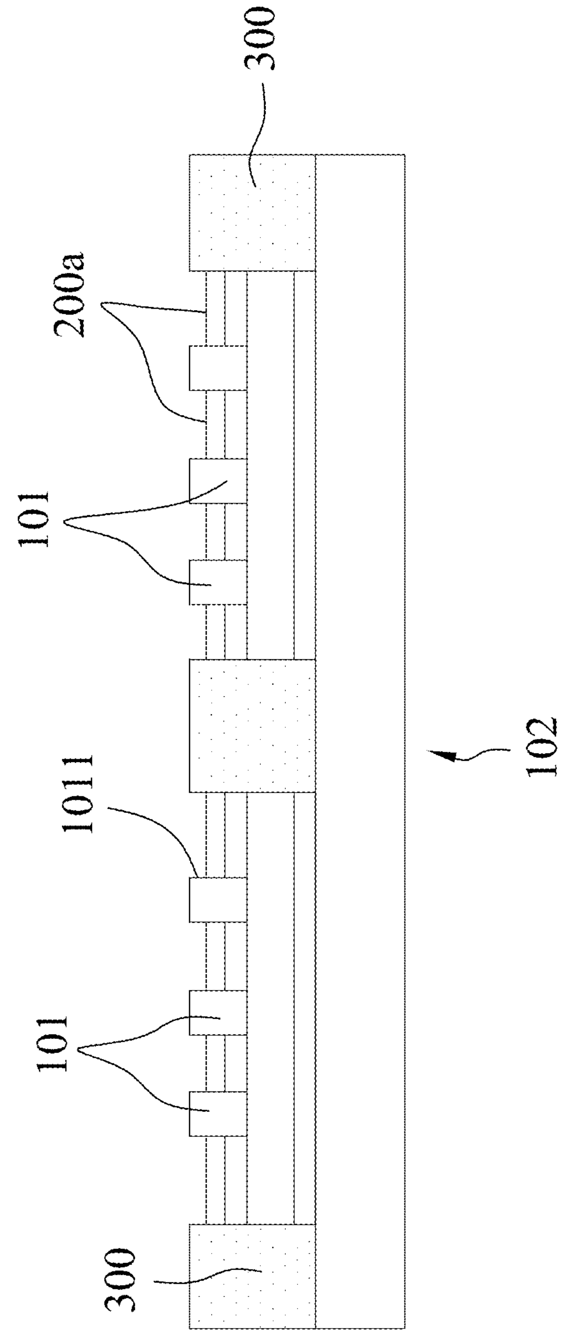
FIG. 3 is a schematic sectional view illustrating that the sacrificial protection layer of the semiconductor device is partially removed after the packaging process.

When it is intended to further conduct multi-chip packaging, as shown in FIG. 1, the sacrificial protection layer 200 and the encapsulating layer 300 on the chip 100 that has been cut and transferred are subjected to polishing, so that a residual portion of the sacrificial protection layer 200 remains on the top surface of the circuit 101. Afterward, through a wet removal process or a dry removal process, the portion of the sacrificial protection layer 200 remaining on the top surface of the circuit 101 is removed, and a portion of the encapsulating layer 300 remaining on the lateral sides of the portions of the chip 100 is partially removed to have a top surface substantially flush with the top surface of the circuit 101. Alternatively, as shown in FIG. 2, the sacrificial protection layer 200 and the encapsulating layer 300 on the chip 100 that has been cut and transferred are subjected to polishing, so that the top surface of the circuit 101 is directly exposed for external electrical connection and the portion of the encapsulating layer 300 remaining on the lateral sides of the portions of the chip 100 has a top surface substantially flush with the top surface of the circuit 101. A portion of the sacrificial protection layer 200 remaining on lateral sides 1011 of the circuit 101 can be kept to protect the circuit 101, and also can be removed to expose the lateral sides 1011 of the circuit 101 for more flexible design for electrical connection with the circuit 101 since the polyimide of the present disclosure is removable. FIGS. 1 and 2 illustrate that, after the packaging, the sacrificial protection layer 200 is completely removed for the lateral sides 1011 of the circuit 101 to be exposed. Nevertheless, referring to FIG. 3, when needed, the sacrificial protection layer 200 can be partially removed, and a residual portion 200*a* of the sacrificial protection layer 200 has a top surface lower than the top surface of the encapsulating layer 300.

The present disclosure will be further described by way of the following examples. However, it should be understood that the following examples are intended solely for the purpose of illustration and should not be construed as limiting the present disclosure in practice.

Preparation of Polyimides of Examples 1 to 23 and Comparative Examples 1 to 8

Polyimides of Examples 1 to 23 according to the present disclosure and those of Comparative Examples 1 to 8 were prepared using different diamine compounds and dianhydride compounds and various ratios thereof. The polyimides of Examples 1 to 23 and Comparative Examples 1 to 8 were later subjected to property and performance evaluation so as to demonstrate the advantages of the polyimide of the present disclosure.

The structural formulae, the abbreviated chemical names (the full names thereof can be found in the description above), and the CAS (Chemical Abstracts Service) registry numbers regarding the diamine compounds and dianhydride compounds respectively for preparing the polyimides of Examples 1 to 23 and Comparative Examples 1 to 8 are shown in Tables 1 and 2 below.

TABLE 1

| Diamine compound | Abbreviated chemical name | Structural formula | CAS registry number |
|---|---|---|---|
| First-type diamine | DABA | 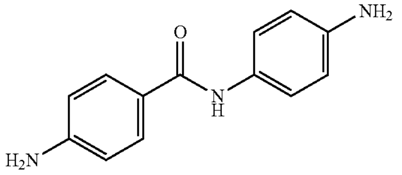 [SMILES: Nc1ccc(NC(=O)c2ccc(N)cc2)cc1] | 785-30-8 |
| | AB-TFMB | 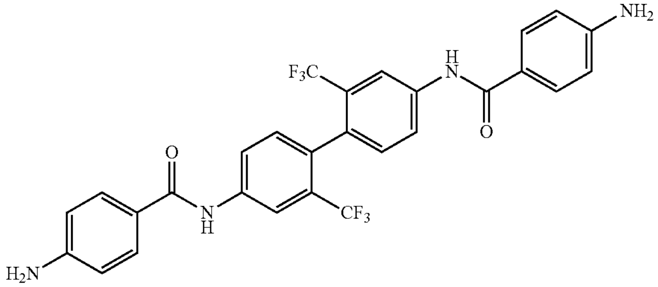 [SMILES: Nc1ccc(C(=O)Nc2ccc(-c3ccc(NC(=O)c4ccc(N)cc4)cc3C(F)(F)F)c(C(F)(F)F)c2)cc1] | 1449757-11-2 |

TABLE 1-continued
| Diamine compound | Abbreviated chemical name | Structural formula | CAS registry number |
|---|---|---|---|
| Second-type diamine | BisAPAF | 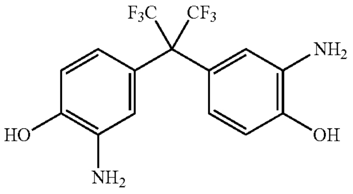 [SMILES: Nc1cc(C(c2ccc(O)c(N)c2)(C(F)(F)F)C(F)(F)F)ccc1O] | 83558-87-6 |
| | BAP | 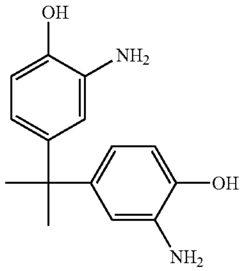 [SMILES: CC(C)(c1ccc(O)c(N)c1)c1ccc(O)c(N)c1] | 1220-78-6 |
| | BAS | 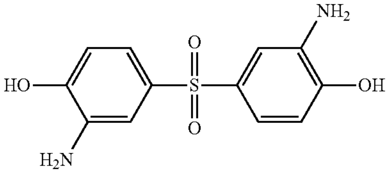 | 7545-50-8 |
| Third-type diamine | PC9410 | 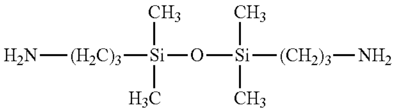 | 2469-55-8 |
| | D400<br>D2000 | 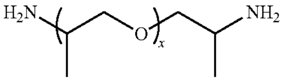<br>x Mw<br>D400 ~6.1 430<br>D2000 ~33 2000 | 9046-10-0 |
| | FDD-A | 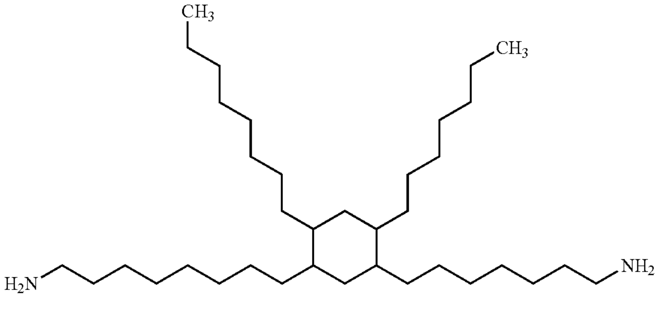 [SMILES: CCCCCCCCC1CC(CCCCCCC)C(CCCCCCCN)CC1CCCCCCCCN] | — |
| Another diamine other than first-type, second-type, and third-type diamines | HFBAPP | 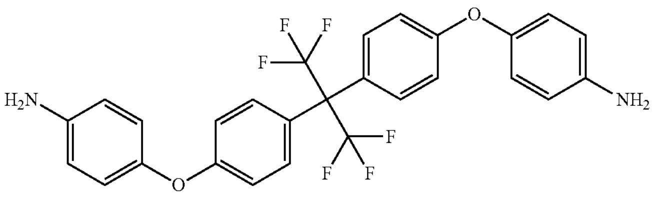 [SMILES: Nc1ccc(Oc2ccc(C(c3ccc(Oc4ccc(N)cc4)cc3)(C(F)(F)F)C(F)(F)F)cc2)cc1] | 69563-88-8 |

TABLE 1-continued
| Diamine compound | Abbreviated chemical name | Structural formula | CAS registry number |
|---|---|---|---|
| | ODA | 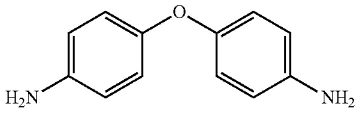 [SMILES: Nc1ccc(Oc2ccc(N)cc2)cc1] | 101-80-4 |
| | DDS | 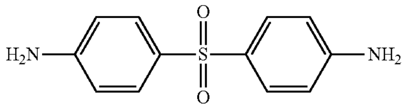 [SMILES: Nc1ccc(S(=O)(=O)c2ccc(N)cc2)cc1] | 80-08-0 |
| | FDA | 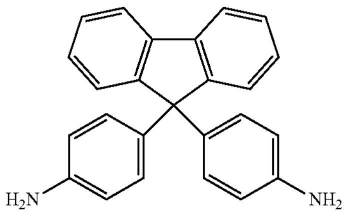 [SMILES: Nc1ccc(C2(c3ccc(N)cc3)c3ccccc3-c3ccccc32)cc1] | 15499-84-0 |
| | APABO | 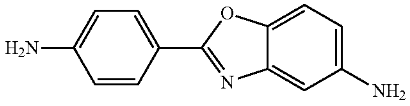 | 13676-47-6 |
| | HAB | 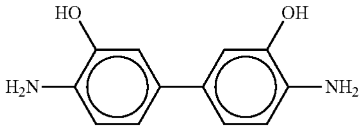 | 2373-98-0 |
TABLE 2
| Dianhydride compound | Abbreviated chemical names | Structural formula | CAS registry number |
|---|---|---|---|
| Aromatic tetracarboxylic dianhydride | ODPA | 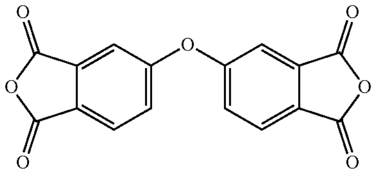 [SMILES: O=C1OC(=O)c2cc(Oc3ccc4c(c3)C(=O)OC4=O)ccc21] | 1823-59-2 |
| | BPDA | 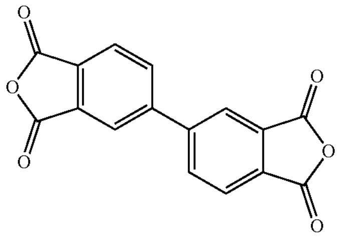 [SMILES: O=C1OC(=O)c2cc(-c3ccc4c(c3)C(=O)OC4=O)ccc21] | 2420-87-3 |
| | BTDA | 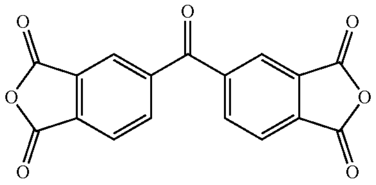 [SMILES: O=C(c1ccc2c(c1)C(=O)OC2=O)c1ccc2c(c1)C(=O)OC2=O] | 2421-28-5 |

TABLE 2-continued

| Dianhydride compound | Abbreviated chemical names | Structural formula | CAS registry number |
|---|---|---|---|
| Alicyclic tetracarboxylic dianhydride | CBDA | 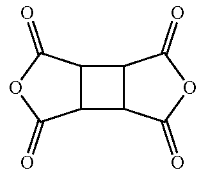 [SMILES: O=C1OC(=O)C2C1C1C(=O)OC(=O)C21] | 4415-87-6 |

The procedures and conditions for preparing the polyimides of Examples 1 to 23 and Comparative Examples 1 to 8 are described below.

For each of the polyimides of Examples 1 to 23 and Comparative Examples 1 to 8, the molar ratio of the diamine compound to the dianhydride compound was 0.98:1. The reaction conditions for preparing the polyimides of Examples 1 to 23 and Comparative Examples 1 to 8 were the same.

A thermometer, a nitrogen gas inlet, and a stirring rod were equipped with a reactor of 1 L. 155 g of N,N-diethylformamide (DEF), i.e. a solvent, was placed in the reactor, following by stirring at 200 rpm. Subsequently, the diamine compound including the diamines in the corresponding amounts was mixed with 155 g of DEF, and the resulting mixture was added into the reactor. After the diamine compound was completely dissolved, a mixture obtained by mixing the dianhydride compound and 80 g of DEF was added into the reactor. The reaction was allowed to proceed at room temperature for 16 hours under stirring, such that the diamine compound and the dianhydride compound reacted with each other to form a polyimide precursor that was a polyamic acid. Subsequently, DEF was added to the polyimide precursor to form a resin composition. The resin composition was diluted to have a viscosity at 25° C. ranging from 4000 cP to 6000 cP. Therefore, 500 g of the resin composition having a solid content ranging from 18 wt % to 23 wt % was obtained.

The resin composition was coated onto a glass substrate through spin coating, such that a coating film was formed on the glass substrate. The rotational speed for the spin coating was suitable for forming a coating film having a thickness of 20 μm.

The coating film was preheated at 50° C. for 5 minutes and at 90° C. for 5 minutes, followed by heating at 230° C. for 60 minutes, so that the polyimide precursor in the coating film underwent polycondensation and ring closure. Therefore, a polyimide film composed of a polyimide was formed from the coating film on the glass substrate, and could serve as a sacrificial protection layer.

Property and Performance Evaluation for Polyimide Films Respectively Composed of Polyimides of Examples 1 to 23 and Comparative Examples 1 to 8

The polyimide films respectively composed of the polyimides of Examples 1 to 23 and Comparative Examples 1 to 8 were subjected to determination of resistance to a liquid packaging material, determination of removability through a wet removal process, and adhesion test (cross-cut test).

Determination of Resistance to Liquid Packaging Material

For simulating a packaging process involving a liquid packaging material to determine the resistance of the polyimide to such liquid packing material at a high temperature, an encapsulating layer was prepared by coating a liquid molding compound (LMC), i.e. a liquid packaging material, and by curing the same at a high temperature of about 120° C. to 180° C. The detail of the resistance determination is described below.

An epoxy resin (manufacturer: Nagase ChemteX Corporation; catalogue no.: Epoxy Resin T693/R4000) served as the liquid molding compound. The liquid molding compound was dripped onto the respective polyimide film on the glass substrate. Pressurizing the liquid molding compound was simulated using a machine having an output pressure of 10 kgw/$cm^2$. Meanwhile, the liquid molding compound was heated to 120° C., and such temperature maintained for 10 was minutes. Subsequently, the liquid molding compound was heated to 230° C., and such temperature was maintained for 1 hour. The liquid molding compound was hence cured to form the encapsulating layer.

The respective polyimide film was observed from a side of the glass substrate opposite to the polyimide film. If the polyimide film was mixed with the liquid molding compound or had a crack, such polyimide film was considered as having no resistance to the liquid molding compound and was given the symbol "X". If not, the polyimide film was considered as having resistance to the liquid molding compound and was given the symbol "○".

Determination of Removability through Wet Removal Process

To determine whether the polyimide film was removable after the packaging process, the following experiment was performed.

The respective combination of the encapsulating layer, the polyimide film, and the glass substrate, which was obtained during the determination of resistance to a liquid packing material (see the section above), and which had been subjected to such determination, was applied in the removability determination. The encapsulating layer was subjected to polishing to expose the polyimide film underneath. The polished combination was immersed in a developer liquid (manufacturer: Jayray Hi-Tech Co. Ltd.; catalogue no.: 920) having a temperature of 50° C. Whether the polyimide film of the polished combination was removable was visually observed. The polyimide film was given one of the symbols which indicate the removability:

X: not removable (not soluble in developer liquid)

Δ: completely removable in a time period larger than 10 minutes

○: completely removable in a time period ranging from 6 to 10 minutes

◎: completely removable in a time period less than 6 minutes

Adhesion Test

The adhesion test was conducted to determine the toughness of the polyimide film and the adhesion of the polyimide film to a component to be protected, so as to evaluate the operability of the polyimide film during a cutting process.

Specifically, the respective polyimide film was subjected to ASTM D3359, i.e. Standard Test Methods for Rating Adhesion by Tape Test. The tape applied was 3M/610 tape. The polyimide film was given one of the following grades which indicate the rate of adhesion, as shown in Table 3 below.

TABLE 3

| Grades | Rate of adhesion |
|---|---|
| 5B | The edges of the cuts are completely smooth. None of the squares or the lattice are detached. |
| 4B | Small flakes of coating are detached at intersections. Less than 5% of the area is affected. |

TABLE 3-continued

| Grades | Rate of adhesion |
|---|---|
| 3B | Small flakes of coating are detached along edges and at intersections of cuts. The area affected is 5% to 15% of the lattice. |
| 2B | The coating has flaked along the edges and at parts of the squares. The area affected is 15% to 35% of the lattice. |
| 1B | The coating has flaked along the edges of cuts in large ribbons and the entire squares have detached. The area affected is 35% to 65% of the lattice. |
| 0B | Flaking and detachment are worse than Grade 1B. |

The type and amount of the diamine compound and dianhydride compound for preparing each of the polyimides of Examples 1 to 23 and Comparative Examples 1 to 8, as well as the results of the property and performance evaluation for the polyimide films respective composed of these polyimides, are shown in Tables 4 to 9 (Examples 1 to 23 are abbreviated as E1 to E23, respectively, and Comparative Examples 1 to 8 are abbreviated as CE1 to CE8, respectively). Please note that, since the molar ratio of the diamine compound to the dianhydride compound applied was 0.98:1, for the sake of easy understanding, the amount of the components of the diamine compound is expressed as a mole number per 98 moles of the diamine compound, and the amount of the components of the dianhydride compound is expressed as a mole number per 100 moles of the diamine compound.

TABLE 4

| | | | E1 | E2 | E3 | E4 | E5 | E6 | E7 |
|---|---|---|---|---|---|---|---|---|---|
| Diamine compound | First-type diamine | DABA | 20 | 30 | 39 | 49 | 49 | 49 | 49 |
| | | AB-TFMB | — | — | — | — | — | — | — |
| | Second-type diamine | BisAPAF | — | 14 | 59 | 49 | 49 | 49 | 49 |
| | | BAP | 73 | 54 | — | — | — | — | — |
| | | BAS | — | — | — | — | — | — | — |
| | Another diamine other than first-type, second-type, and third-type diamines | HFBAPP | — | | — | — | — | — | — |
| | | ODA | 5 | — | — | — | — | — | — |
| | | DDS | — | — | — | — | — | — | — |
| | | FDA | — | — | — | — | — | — | — |
| | | APABO | — | — | — | — | — | — | — |
| | | HAB | — | — | — | — | — | — | — |
| Dianhydride compound | Aromatic tetracarboxylic dianhydride | ODPA | 80 | 80 | 100 | 100 | — | — | 50 |
| | | BPDA | 20 | 20 | — | — | 100 | — | 50 |
| | | BTDA | — | — | — | — | — | 100 | — |
| | Alicyclic tetracarboxylic dianhydride | CBDA | — | — | — | — | — | — | — |
| Evaluation result | Resistance to liquid packaging material | | ○ | ○ | ○ | ○ | ○ | ○ | ○ |
| | Removability through wet removal process | | ○ | ○ | Δ | ○ | ○ | ○ | ○ |

TABLE 5

| | | | E8 | E9 | E10 | E11 | E12 | E13 |
|---|---|---|---|---|---|---|---|---|
| Diamine compound | First-type diamine | DABA | 49 | 49 | 49 | 49 | 59 | — |
| | | AB-TFMB | — | — | — | — | — | 59 |
| | Second-type diamine | BisAPAF | — | — | 47 | 47 | 37 | 39 |
| | | BAP | 49 | — | — | — | — | — |
| | | BAS | — | 49 | — | — | — | — |
| | Another diamine other than | HFBAPP | — | — | — | — | — | — |
| | | ODA | — | — | 2 | 2 | 2 | — |

TABLE 5-continued

| | | | E8 | E9 | E10 | E11 | E12 | E13 |
|---|---|---|---|---|---|---|---|---|
| | first-type, | DDS | — | — | — | — | — | — |
| | second-type, | FDA | — | — | — | — | — | — |
| | and third-type | APABO | — | — | — | — | — | — |
| | diamines | HAB | — | — | — | — | — | — |
| Dianhydride compound | Aromatic | ODPA | 100 | 100 | 100 | — | 100 | 100 |
| | tetracarboxylic | BPDA | — | — | — | 100 | — | — |
| | dianhydride | BTDA | — | — | — | — | — | — |
| | Alicyclic tetracarboxylic dianhydride | CBDA | — | — | — | — | — | — |
| Evaluation result | Resistance to liquid packaging material | | ○ | ○ | ○ | ○ | ○ | ○ |
| | Removability through wet removal process | | ○ | ○ | Δ | Δ | Δ | ○ |

TABLE 6

| | | | CE1 | CE2 | CE3 | CE4 |
|---|---|---|---|---|---|---|
| Diamine compound | First-type | DABA | 15 | 59 | 59 | 59 |
| | diamine | AB-TFMB | — | — | — | — |
| | Second-type | BisAPAF | 74 | — | — | — |
| | diamine | BAP | 9 | — | — | — |
| | | BAS | | — | — | — |
| | Another diamine | HFBAPP | — | — | 39 | — |
| | other than | ODA | — | — | — | — |
| | first-type, | DDS | — | — | — | 39 |
| | second-type, and | FDA | — | — | — | — |
| | third-type | APABO | — | — | — | — |
| | diamines | HAB | | 39 | — | — |
| Dianhydride compound | Aromatic | ODPA | 70 | 100 | 100 | 100 |
| | tetracarboxylic | BPDA | 30 | — | — | — |
| | dianhydride | BTDA | — | — | — | — |
| | Alicyclic tetracarboxylic dianhydride | CBDA | — | — | — | — |
| Evaluation result | Resistance to liquid packaging material | | X | ○ | X | X |
| | Removability through wet removal process | | ○ | X | ○ | ⊚ |

TABLE 7

| | | | CE5 | CE6 | CE7 | CE8 |
|---|---|---|---|---|---|---|
| Diamine compound | First-type | DABA | — | — | — | — |
| | diamine | AB-TFMB | — | — | — | — |
| | Second-type | BisAPAF | 39 | 39 | 39 | 39 |
| | diamine | BAP | — | — | — | — |
| | | BAS | — | — | — | — |
| | Another diamine | HFBAPP | — | — | — | — |
| | other than | ODA | 59 | — | — | — |
| | first-type, | DDS | — | 59 | — | — |
| | second-type, and | FDA | — | — | 59 | — |
| | third-type | APABO | — | — | — | 59 |
| | diamines | HAB | — | — | — | — |

TABLE 7-continued

| | | | CE5 | CE6 | CE7 | CE8 |
|---|---|---|---|---|---|---|
| Dianhydride compound | Aromatic | ODPA | 100 | 100 | 100 | 100 |
| | tetracarboxylic | BPDA | — | — | — | — |
| | dianhydride | BTDA | — | — | — | — |
| | Alicyclic tetracarboxylic dianhydride | CBDA | — | — | — | — |
| Evaluation result | Resistance to liquid packaging material | | ○ | X | X | ○ |
| | Removability through wet removal process | | X | ⊚ | ○ | X |

TABLE 8

| | | | E14 | E15 | E16 | E17 |
|---|---|---|---|---|---|---|
| Diamine compound | First-type | DABA | 70 | 70 | 59 | 80 |
| | diamine | AB-TFMB | — | — | — | — |
| | Second-type | BisAPAF | 15 | 4 | 39 | — |
| | diamine | BAP | — | 15 | — | — |
| | | BAS | — | — | — | 18 |
| | Another diamine | HFBAPP | 4 | — | — | — |
| | other than | ODA | 9 | 9 | — | — |
| | first-type, | DDS | — | — | — | — |
| | second-type, | FDA | — | — | — | — |
| | and third-type | APABO | — | — | — | — |
| | diamines | HAB | — | — | — | — |
| Dianhydride compound | Aromatic | ODPA | 80 | — | 50 | — |
| | tetracarboxylic | BPDA | — | 70 | — | 30 |
| | dianhydride | BTDA | — | — | — | — |
| | Alicyclic tetracarboxylic dianhydride | CBDA | 20 | 30 | 50 | 70 |
| Evaluation result | Resistance to liquid packaging material | | ○ | ○ | ○ | ○ |
| | Removability through wet removal process | | ○ | ○ | ○ | ○ |
| | Adhesion | | 5B | 2B | 3B | 0B |

TABLE 9

| | | | E18 | E19 | E20 | E21 | E22 | E23 |
|---|---|---|---|---|---|---|---|---|
| Diamine compound | First-type diamine | DABA | 59 | 59 | 49 | 49 | 59 | 49 |
| | | AB-TFMB | — | — | — | — | — | — |
| | Second-type diamine | BisAPAF | 30 | 30 | 30 | — | 30 | — |
| | | BAP | — | — | — | 20 | — | 30 |
| | | BAS | — | — | — | — | — | — |
| | Third-type diamine | PC9410 | 9 | — | — | — | — | — |
| | | D400 | | 9 | 19 | 29 | — | — |
| | | D2000 | — | — | — | — | 9 | — |
| | | FDD | — | — | — | — | — | 19 |

TABLE 9-continued

| | | | E18 | E19 | E20 | E21 | E22 | E23 |
|---|---|---|---|---|---|---|---|---|
| | Another diamine other than first-type, second-type, and third-type diamines | HFBAPP | — | — | — | — | — | — |
| | | ODA | — | — | — | — | — | — |
| | | DDS | — | — | — | — | — | — |
| | | FDA | — | — | — | — | — | — |
| | | APABO | — | — | — | — | — | — |
| | | HAB | — | — | — | — | — | — |
| Dianhydride compound | Aromatic tetracarboxylic dianhydride | ODPA | 100 | 100 | 50 | 100 | 100 | 50 |
| | | BPDA | — | — | 50 | — | — | 50 |
| | | BTDA | — | — | — | — | — | — |
| | Alicyclic tetracarboxylic dianhydride | CBDA | — | — | — | — | 20 | 30 |
| Evaluation result | Resistance to liquid packaging material | | ○ | ○ | ○ | ○ | ○ | ○ |
| | Removability through wet removal process | | ◎ | ◎ | ◎ | ◎ | ◎ | ◎ |
| | Adhesion | | 5B | 3B | 3B | 2B | 2B | 3B |

Referring to Tables 4 to 7, the polyimides of CE2 to CE8, which were not prepared using both the first-type diamine and the second-type diamine, could not exhibit satisfactory resistance to a liquid packaging material and satisfactory removability through a wet removal process, hence being unable to serve as a suitable material for the sacrificial protection layer applicable during packaging of an electronic device. In addition, even though the polyimide of CE1 was prepared using both the first-type diamine and the second-type diamine, the amount of the first-type diamine was not sufficient, such that the resistance to a liquid packaging material was still unsatisfactory in spite of enhanced removability through a wet removal process. However, the polyimides, which were prepared using both the first-type diamine and the second-type diamine, and which was prepared using a molar amount of the first-type diamine not less than 20 mol % based on the total molar amount of the diamine compound, exhibited satisfactory resistance to a liquid packaging material and satisfactory removability through a wet removal process. Therefore, the polyimide of the present disclosure can be used as a material for the sacrificial protection layer applicable during packaging of an electronic device, and can protect a chip from negative influence by a liquid packaging material during the packaging process.

Referring to Table 8, the use of the alicyclic tetracarboxylic dianhydride could optimally adjust the toughness and adhesion of the polyimide film, as well as the polyimide's removability through a wet removal process. However, when the molar amount of the alicyclic tetracarboxylic dianhydride was greater than 30 mol % based on the total molar amount of the dianhydride compound, the adhesion of the resulting polyimide to a material was reduced. In addition, when the mole number of the first-type diamine per 98 moles of the diamine compound was higher (i.e. 70 moles to 80 moles), the use of the another diamine (other than first-type, second-type, and third-type diamines) and/or the alicyclic tetracarboxylic dianhydride could adjust the toughness and adhesion of the polyimide film.

Referring to Table 9, by virtue of the third-type diamine having a soft segment, the polyimides of the examples could have enhanced removability through a wet removal process. When the soft segment of the third-type diamine was a polyether group or an alicyclic group (see E19 to E23), not only the removability through a wet removal process could be improved, but also the toughness and adhesion of the polyimide film could be adjusted and secured. Therefore, the polyimide film prepared using the first-type, second-type, and third-type diamines is more satisfactory as a material for the sacrificial protection layer applicable during the packaging process and the cutting process thereafter.

In view of the foregoing, since the first-type diamine has smaller steric hindrance, the molecular distance between the first-type diamine and the second-type diamine can be rendered optimal to form the well stacked structure and to have hydrogen bonds between the amide groups or between the amide and hydroxyl groups more easily cooperative. Due to such compactly stacked structure, the polyimide of the present disclosure has excellent resistance to a liquid packaging material. Further, by controlling the ratio of the amide group to the hydroxyl group, the polyimide of the present disclosure has enhanced removability through a wet removal process. Still further, by using the aromatic tetracarboxylic dianhydride and/or the alicyclic tetracarboxylic dianhydride, the polyimide of the present disclosure can have satisfactory resistance to a liquid packaging material and optimal adhesion and toughness, such that the polyimide of the present disclosure can have better attachability to a component to be protected (e.g. a chip) during the packaging process and is suitable for the cutting process after the packaging process. Lastly, since the polyimide of the present disclosure is removable through a wet removal process, the removability of such polyimide after the packaging process renders the subsequent processing more flexible and more widely applicable.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A semiconductor device comprising:

a semiconductor chip having a circuit;

a sacrificial protection layer disposed to cover at least a lateral side of the circuit; and an encapsulating layer disposed to cover at least a lateral side of the sacrificial protection layer, wherein the sacrificial protection layer is made from a polyimide which is a product from polycondensation and ring formation of a polyimide precursor, the polyimide precursor including:

a repeating unit of formulae (I) and (II):

(I)

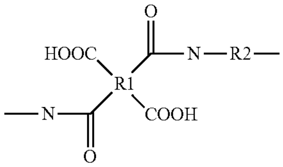

(II)

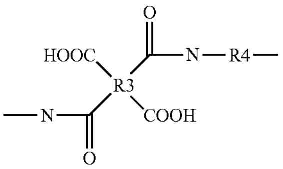

where R1 and R3 are each a tetravalent group of a tetracarboxylic dianhydride residue, and R2 and R4 are respectively a divalent group of a residue of a first-type diamine and a divalent group of a residue of a second-type diamine, wherein the first-type diamine is represented by formula (III):

(III)

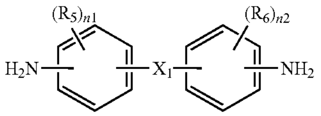

where $X_1$ is a divalent group containing at least one amide group, $R_5$ and $R_6$ are respectively non-hydrogen substituents, and n1 and n2 are respectively numbers of the non-hydrogen substituents and independently range from 0 to 4, $R_5$ and $R_6$ being independently selected from the group consisting of a halogen, a $C_1$ to $C_3$ alkyl group, and a $C_1$ to $C_3$ haloalkyl group, and wherein the second-type diamine is represented by formula (IV):

(IV)

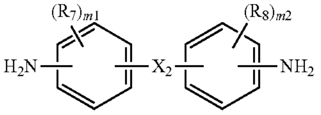

where $X_2$ is a divalent group and is not a single bond, $R_7$ and $R_8$ are respectively non-hydrogen substituents, and m1 and m2 are respectively numbers of the non-hydrogen substituents and independently range from 0 to 4, a sum of m1 and m2 being at least 1, $R_7$ and $R_8$ being independently selected from the group consisting of a hydroxyl group, a halogen, a $C_1$ to $C_3$ alkyl group, and a $C_1$ to $C_3$ haloalkyl group, $R_7$ and $R_8$ having at least one hydroxyl group, wherein the polyimide includes a repeating unit of formulae (X) and (Y):

(X)

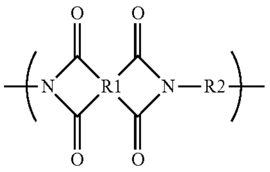

(Y)

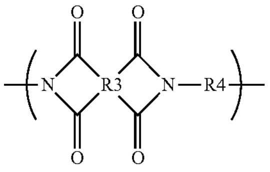

where R1 and R2 in formula (X) have the same definitions as those in formula (I), and R3 and R4 in formula (Y) have the same definitions as those in formula (II).

2. The semiconductor device as claimed in claim 1, wherein the sacrificial protection layer is disposed to completely cover the circuit, and the encapsulating layer is disposed to further cover a top surface of the sacrificial protection layer opposite to the circuit.

3. The semiconductor device as claimed in claim 1, wherein the sacrificial protection layer is disposed to cover only the lateral side of the circuit, so that a top surface of the circuit is exposed from the sacrificial protection layer, the encapsulating layer being disposed to cover only the lateral side of the sacrificial protection layer, so that the sacrificial protection layer has a top surface opposite to the circuit which is lower than or flush with a top surface of the encapsulating layer distal from the circuit.

4. The polyimide-semiconductor device as claimed in claim 1, wherein the first-type diamine is represented by formula (III-1) or formula (III-2):

(III-1)

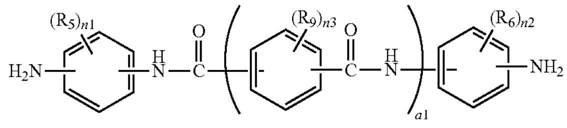

(III-2)

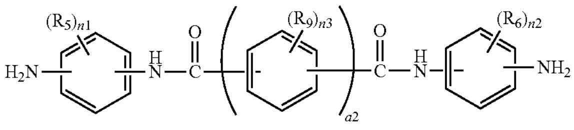

where $R_9$ is a non-hydrogen substituent, and n3 is a number of the non-hydrogen substituent and ranges from 0 to 4, $R_9$ being selected from the group consisting of a halogen, a $C_1$ to $C_3$ alkyl group, and a $C_1$ to $C_3$ haloalkyl group, a1 ranging from 0 to 3, a2 ranging from 1 to 3.

5. The semiconductor device as claimed in claim 1, wherein $X_2$ is a disubstituted methylene group or a sulfone group.

6. The semiconductor device as claimed in claim 1, wherein the polyimide precursor is prepared by reacting a dianhydride compound and a diamine compound containing the first-type diamine and the second-type diamine, the first-type diamine being present in a molar amount that is not less than 20 mol %.

7. The semiconductor device as claimed in claim 6, wherein, based on the total molar amount of the diamine compound, the first-type diamine is present in a molar amount that ranges from 20 mol % to 80 mol %.

8. The semiconductor device as claimed in claim 6, wherein the dianhydride compound includes an aromatic tetracarboxylic dianhydride having 1 to 4 aromatic rings, based on a total molar amount of the dianhydride compound, the aromatic tetracarboxylic dianhydride being present in a molar amount that is greater than 30 mol %.

9. The semiconductor device as claimed in claim 8, wherein the dianhydride compound further includes an alicyclic tetracarboxylic dianhydride.

10. The semiconductor device as claimed in claim 6, wherein the diamine compound further includes a third-type diamine, which is a diamine having a soft segment, based on the total molar amount of the diamine compound, the third-type diamine being present in a molar amount that is not greater than 30 mol %.

11. The semiconductor device as claimed in claim 10, wherein the soft segment is selected from the group consisting of polyether, siloxane group, and an alicyclic group.

* * * * *